US012600287B2

(12) United States Patent
Knox et al.

(10) Patent No.: US 12,600,287 B2
(45) Date of Patent: Apr. 14, 2026

(54) SYSTEMS AND METHODS FOR RESTRAINING CARTS AND OTHER CARGO USING FORWARD AND REARWARD BRACKETS

(71) Applicants: Ancra International LLC, Azusa, CA (US); Wabash National, L.P., Lafayette, IN (US)

(72) Inventors: Howard Thomas Knox, Cold Spring, KY (US); Gregory Alan Kauffman, Cincinnati, OH (US); Aaron Michael Smith, Indianapolis, IN (US); James Juhyeon Song, Indianapolis, IN (US); Michael Robert Stimler, Huntington Beach, CA (US)

(73) Assignees: Ancra International LLC, Azusa, CA (US); Wabash National, L.P., Lafayette, IN (US)

( * ) Notice: Subject to any disclaimer, the term of this patent is extended or adjusted under 35 U.S.C. 154(b) by 563 days.

(21) Appl. No.: 17/978,456

(22) Filed: Nov. 1, 2022

(65) Prior Publication Data

US 2023/0134593 A1 May 4, 2023

Related U.S. Application Data

(60) Provisional application No. 63/275,599, filed on Nov. 4, 2021.

(51) Int. Cl.
*B60P 7/08* (2006.01)

(52) U.S. Cl.
CPC ........... *B60P 7/0892* (2013.01); *B60P 7/0815* (2013.01)

(58) Field of Classification Search
CPC ......... B60P 7/08; B60P 7/0815; B60P 7/0892; B60P 7/15; B61D 45/001; A47F 5/0846; A47F 5/0853; B25H 3/04
See application file for complete search history.

(56) References Cited

U.S. PATENT DOCUMENTS 1,735,800 A 11/1929 Snyder
1,736,290 A * 11/1929 Schiff ...................... F16L 3/16
248/113

(Continued)

FOREIGN PATENT DOCUMENTS

DE 20302929 U1 7/2003
DE 102008002253 A1 11/2009
EP 2368759 A1 9/2011

OTHER PUBLICATIONS

CargoSmart Landscape Tool Holder—for E-Track and X-Track; Amazon.com website: https://a.co/d/eO7QgSb; accessed Mar. 31, 2025, published Mar. 23, 2016. (Year: 2016).*

(Continued)

*Primary Examiner* — Daniel J Colilla
(74) *Attorney, Agent, or Firm* — Shook, Hardy & Bacon L.L.P.

(57) ABSTRACT

Systems and methods are provided for restraining cargo in a cargo compartment. In one embodiment, the system comprises a bracket having a main plate segment. At least one adapter is coupled to the bracket and dimensioned to be releasably secured to a location within the cargo compartment. A hook is disposed along a portion of the bracket, the hook comprising a receiving space formed between a rear segment, an end segment and a front segment. A portion of cargo is dimensioned to be placed within a portion of the receiving space. The system may include a locking member, wherein the portion of cargo is capable of being inserted into the receiving space when the locking member is in an open state, and wherein the portion of cargo is restrained from forward, rearward and lateral movement in the cargo compartment when the locking member is in a closed state.

20 Claims, 10 Drawing Sheets

(56)  References Cited

U.S. PATENT DOCUMENTS

| 2,901,204 | A | * | 8/1959 | Davis | ...................... B63B 29/10 |
| | | | | | 248/307 |
| 7,731,462 | B2 | | 6/2010 | Squyres et al. | |
| 10,940,787 | B1 | | 3/2021 | Woosley | |
| 2010/0001159 | A1 | * | 1/2010 | Kao | ......................... B25H 3/04 |
| | | | | | 248/316.4 |
| 2017/0166103 | A1 | * | 6/2017 | Eichstedt | ................ B60R 9/045 |
| 2018/0022263 | A1 | | 1/2018 | Meyers | |
| 2018/0024418 | A1 | | 1/2018 | Clark | |
| 2025/0276632 | A1 | * | 9/2025 | Knox | ................... B60P 7/0815 |

OTHER PUBLICATIONS

Etrailer.com; etrailer | CargoSmart E-track or X-Track System Dual Track Brackets Review; https://www.youtube.com/watch?v=074agZoCNJM; accessed Mar. 31, 2025; published Feb. 11, 2019. (Year: 2019).*
Gridiron CTS; Gridiron CTS Trimmer Bracket Overview; https://www.youtube.com/watch?v=59KXFTBbsW0; accessed Mar. 31, 2025; published Jan. 29, 2020. (Year: 2020).*
International Preliminary Report on Patentability received for PCT Patent Application No. PCT/US2022/048567, mailed on May 16, 2024, 9 pages.

* cited by examiner

SYSTEMS AND METHODS FOR RESTRAINING CARTS AND OTHER CARGO USING FORWARD AND REARWARD BRACKETS

PRIORITY CLAIM

This application claims the benefit of priority under 35 U.S.C. § 119 (e) of U.S. Provisional Patent Application Ser. No. 63/275,599, filed Nov. 4, 2021, which is hereby incorporated by reference in its entirety.

BACKGROUND

The present embodiments relate generally to systems and methods for restraining cargo, such as carts, when disposed in a movable cargo compartment.

Certain movable cargo compartments employ the use of beams or straps to restrain cargo being transported within the cargo compartment. In some systems, stand-alone beams spanning a full width of the cargo compartment are brought in from outside of the cargo compartment, and in each usage are engaged and disengaged from coupling locations in the cargo compartment. In such situations, the stand-alone beams are required to be stored at a loading dock, and may need to be moved on and off the cargo compartment each time it is loaded or unloaded. This process takes added time and may increase the likelihood of injuries.

In some other systems, cargo securement straps may be used to secure cargo. However, in a situation where the cargo comprises a plurality of carts, a significant number of straps would be required to adequately restrain the carts individually. Further, the straps would take a relatively long time to install, and subsequently need to be rolled into a storage state.

Moreover, if a relatively small number of carts or other cargo are in the cargo compartment, there is a particular need to restrain the cargo in each of forward, rearward and lateral directions because, in such relatively empty compartments, the carts or cargo cannot rely upon a well-packed or abutting state with each other to limit forward, rearward or lateral movement.

SUMMARY

Systems and methods are provided for restraining cargo in a cargo compartment. In one embodiment, the system comprises a bracket having a main plate segment having a front side and a rear side. At least one adapter is coupled to the bracket, wherein the at least one adapter is dimensioned to be releasably secured to a track within the cargo compartment. A hook is disposed along a portion of the bracket, the hook comprising a rear segment, an end segment and a front segment. A receiving space is formed between the rear segment, the end segment and the front segment, and a portion of cargo is dimensioned to be placed within a portion of the receiving space. In one example, the system includes a locking member having an open state and a closed state, wherein the portion of cargo is capable of being inserted into the receiving space when the locking member is in the open state, and wherein the portion of cargo is restrained from forward, rearward and lateral movement in the cargo compartment when the locking member is in the closed state.

In one example, the locking member comprises a main body having a width that is less than a width of the receiving space so that a portion of the locking member extends into the receiving space in the closed state. A stop member may be connected to the locking member, the stop member having a width greater than the width of the receiving space, such that stop member limits movement of the locking member into the receiving space in the closed state. The stop member may be dimensioned to catch upon at least one of an upper surface of the rear segment of the hook member or an upper surface of the front segment of the hook member in the closed state. The stop member may comprise a plate-like member having a width that extends laterally beyond a periphery of the main body of the locking member.

In one embodiment, the locking member comprises a main body that is rotatable relative to the hook, wherein the locking member rotates into engagement with a portion of the hook in the closed state.

In some embodiments, the locking member is both axially moveable and rotatable relative to the main plate segment. A slot may be disposed in the locking member, and a pivot pin extends from the main plate segment toward an interior of the cargo compartment. A portion of the pivot pin may extend through the at least one slot in the locking member, such that the locking member can move axially relative to the pivot pin.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
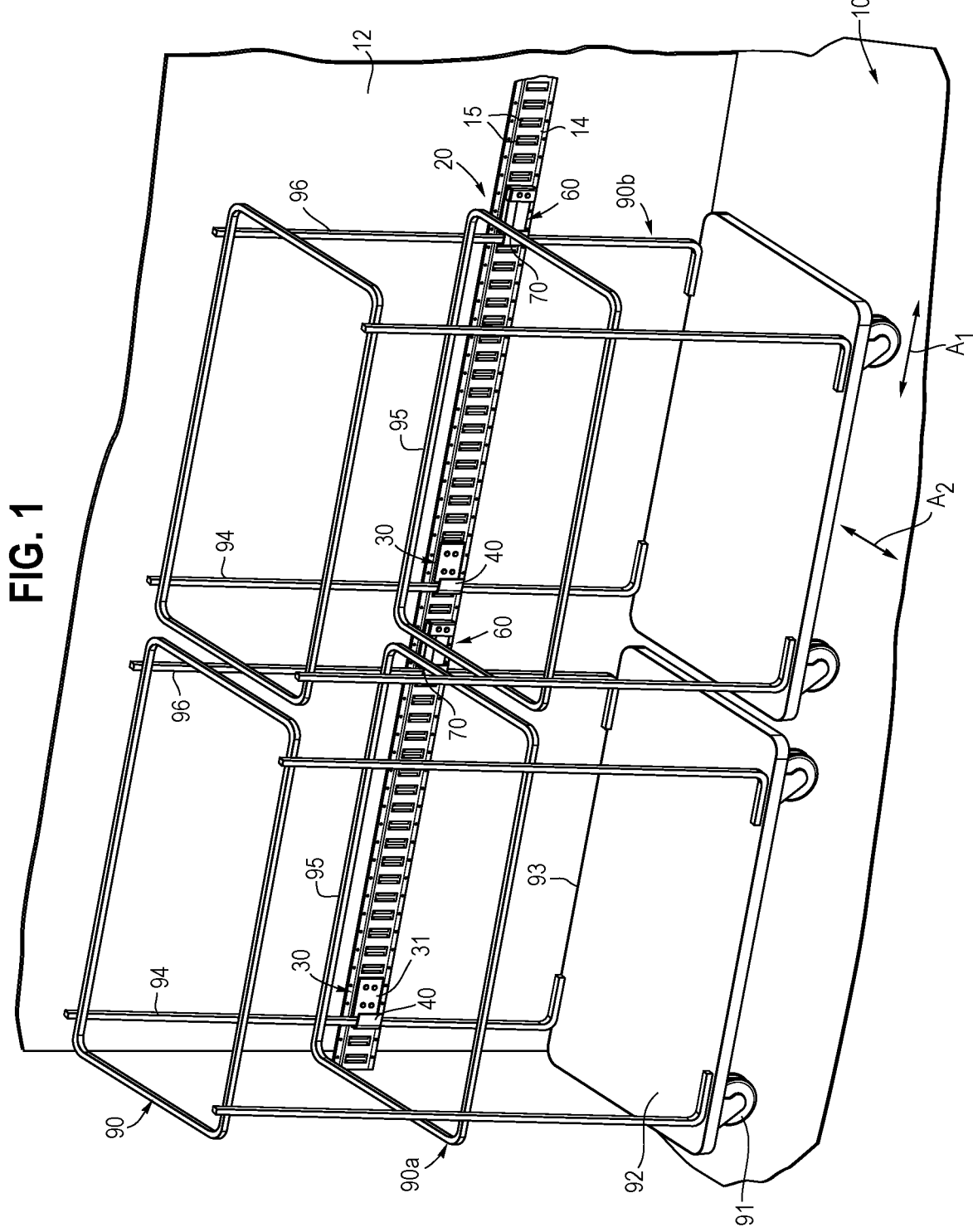
FIG. 1 is a perspective view of an exemplary cargo compartment, including features of a system for restraining cargo in accordance with the present embodiments, taken in a partially rearward to forward direction.
Figure 2:
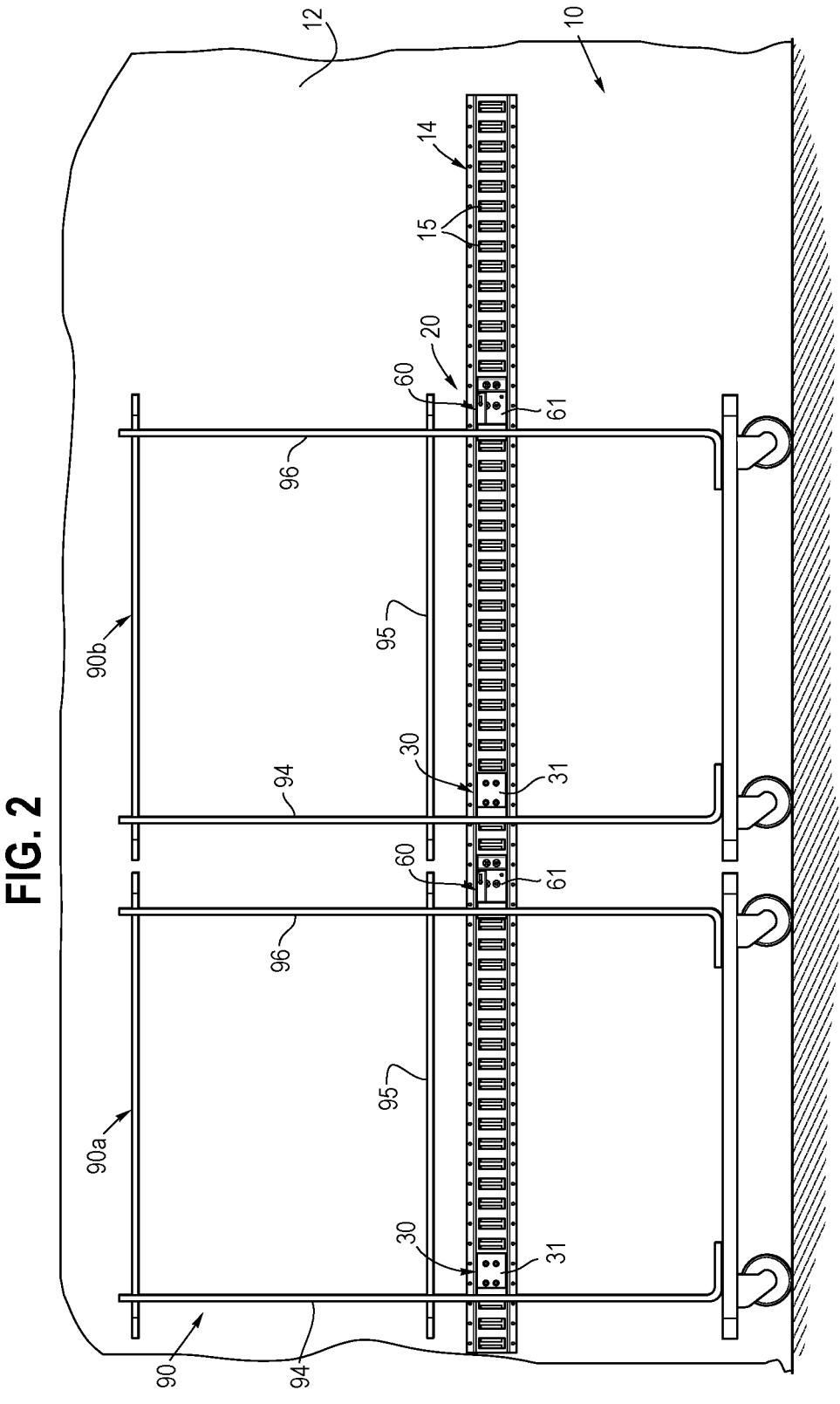
FIG. 2 is a side view of the system of FIG. 1.

Referring to FIGS. 1-7, a first embodiment of a system 20 for restraining cargo 90 within a cargo compartment 10 is provided. As depicted in FIGS. 1-2, the cargo compartment 10 may be for a truck, a trailer, a cargo van, an intermodal container, a rail car, a compartment on a boat or aircraft or the like. While any of these types of cargo compartments can successfully receive the system 20, the system 20 will be described and depicted in detail as installed and used within the cargo compartment of a truck. One of ordinary skill in the art with a thorough review of this specification and figures will readily understand that the system 20 can be adapted for other types of cargo compartments and would be able to implement the system 20 in other types of cargo compartments.

Moreover, while many types of cargo 90 can successfully be restrained by the system 20, the cargo 90 will be described and depicted herein as a plurality of carts 90, such as two exemplary carts 90a and 90b. One of ordinary skill in the art with a thorough review of this specification and figures will readily understand that the system 20 can be adapted for other types of cargo and would be able to implement the system 20 with other types of cargo (such as boxes or pallets), in addition to carts. Moreover, one of ordinary skill in the art will readily understand that while two exemplary carts 90a and 90b are depicted herein, the system 20 can be used with only one cargo item in the compartment 10, or alternatively with three or more cargo items in the compartment 10.

The system 20 comprises at least one bracket, and in the example of FIGS. 1-7 a plurality of brackets, in particular a forward bracket 30 and a rearward bracket 60, that are adapted to be adjustably mounted within the cargo compartment 10, and coupled to a sidewall 12 of the cargo compartment 10, as explained in further detail below. A fixed track 14 having a plurality of spaced-apart apertures 15 may extend along the sidewall 12, as depicted in FIGS. 1-2. In the example of a cargo compartment of a truck, it will be appreciated that the truck comprises an opposing sidewall (which is not depicted in the views of FIGS. 1-2), and that another horizontal track with apertures may be disposed on that opposing sidewall and used in a similar manner. As described herein, the cargo compartment 10 comprises a main axis $A_1$ extending forward to rearward within the cargo compartment, and a lateral axis $A_2$ extending in a direction from one sidewall 12 toward an opposite sidewall, as depicted in FIG. 1. As explained further below, the system 20 is capable of restraining movement of cargo in forward and rearward directions along the main axis $A_1$, and further restraining lateral movement of the cargo along the lateral axis $A_2$.

The track 14 may be one of a plurality of lengths of stationary logistics track, such as "A" or "E" track, which are well known in the art. The logistics track is normally rigidly mounted to the walls or floor of a cargo compartment, or to a storage facility. In some embodiments, the track 14 comprises a vertically or horizontally aligned track that is mounted to the walls of the cargo compartment. In the exemplary systems herein, the track 14 is depicted as being a horizontally aligned track that is mounted to the sidewall 12 of the cargo compartment 10. In some embodiments, a plurality of tracks 14 may be disposed upon multiple walls of the cargo compartment 10, or each wall of the compartment, to allow for flexibility in the arrangement of the cargo 90, which is releasably mounted to the tracks 14 for desired storage and transport purposes.

Figure 3:
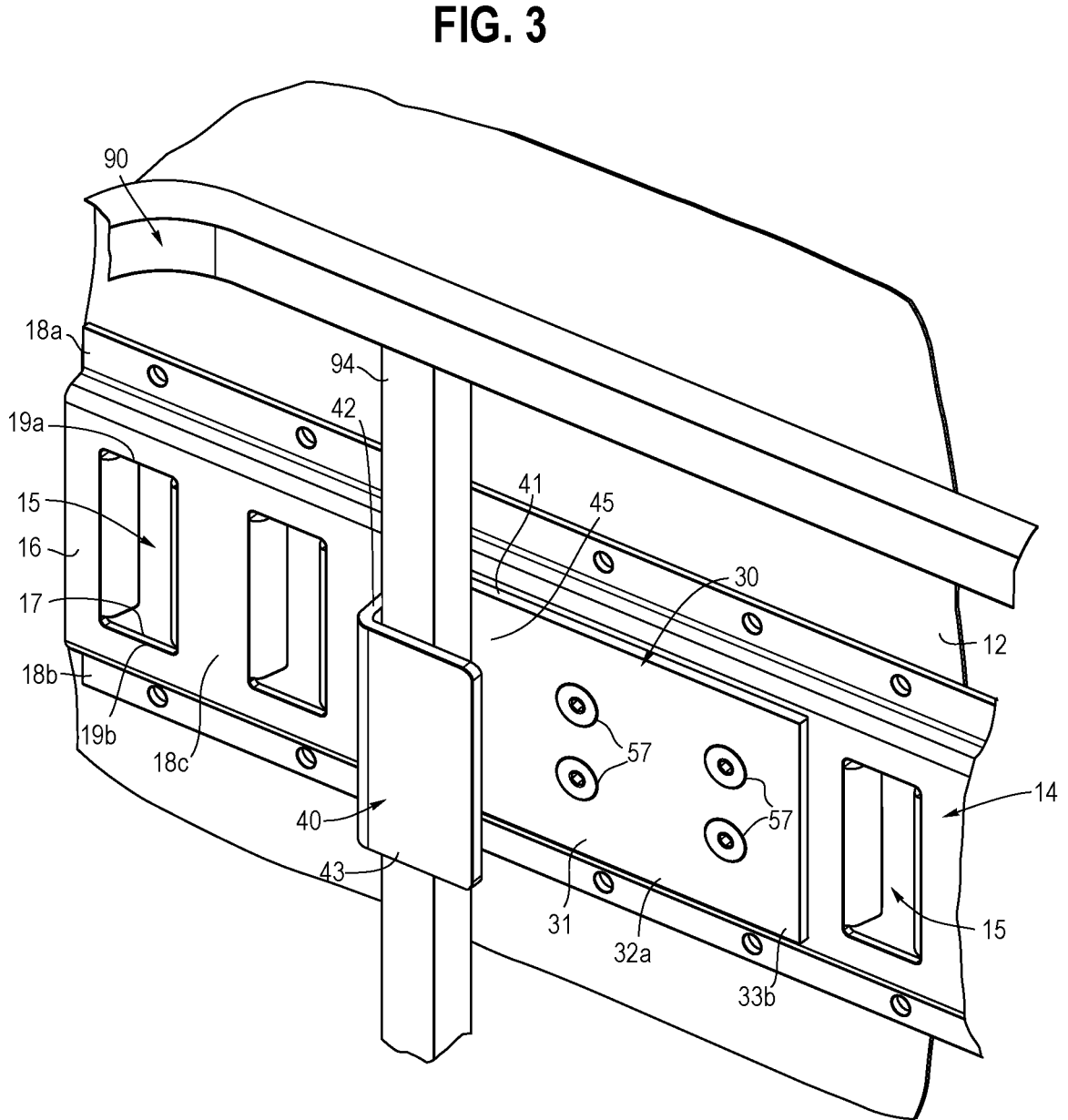
FIG. 3 is a perspective view showing features of a front side of a forward bracket of the system of FIGS. 1-2, wherein the forward bracket is coupled to a track in the cargo compartment.

The plurality of apertures 15 may extend from a front surface 16 of the track 14 and through the track to a rear surface 17 of the track 14, as best depicted in FIG. 3. The apertures 15 are disposed in a spaced relationship along the length of the track 14, such as at equal spacing from each other.

In some embodiments, as best shown in FIG. 3, the track 14 may include first and second portions 18a and 18b that are secured to a mounting surface such as sidewall 12 of the cargo compartment 10. The track 14 may further comprise a central portion 18c, which is set forward of the first and second portions 18a and 18b, in order to create a space behind the central portion 18c when the track 14 is secured to the sidewall 12. In this example, the central portion 18c of the track 14 includes the plurality of apertures 15, as depicted in FIG. 3.

As will be explained in further detail below, each of the forward bracket 30 and the rearward bracket 60 may comprise, or be coupled to, at least one adapter 50, which is configured to secure the respective forward and rearwards brackets 30 and 60 to the track 14 in the cargo compartment 10. The forward and rearwards brackets 30 and 60 work in conjunction with one another to help restrain movement of the cargo 18 in various directions, as will be explained below.

Figure 4:
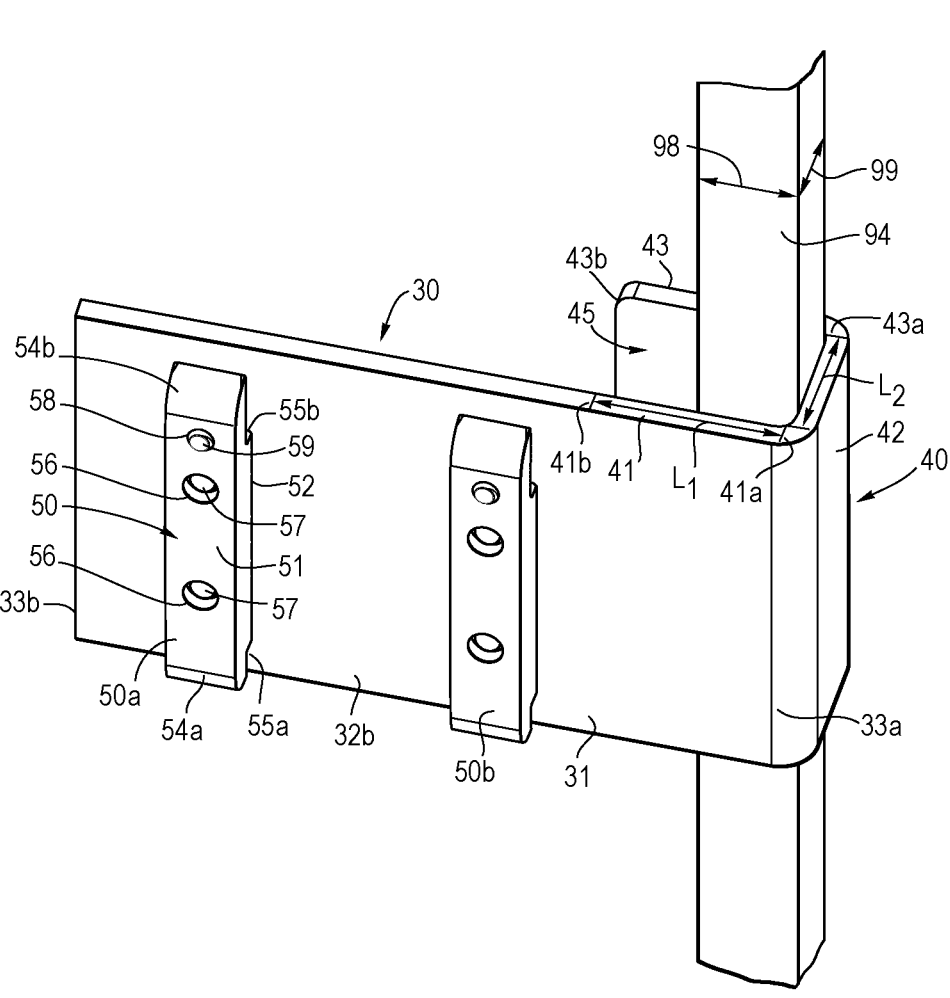
FIG. 4 is a perspective view showing features of a rear side of the forward bracket of the system of FIG. 3 (where the track in the cargo compartment is omitted for illustrative purposes).

Referring to FIGS. 3-4, further features of the forward bracket 30 are shown and described. The forward bracket 30 comprises a main plate segment 31 having a front side 32a and a rear side 32b, and further having forward and rearward end regions 33a and 33b, respectively. In this example, the main plate segment 31 comprises a generally rectangular shape having a greater horizontal length relative to its vertical height, as depicted in FIGS. 3-4.

The forward bracket 30 comprises a hook 40 at its forward region. In one example, the hook 40 may comprise a generally U-shape that includes a rear segment 41, an end segment 42 and a front segment 43, as depicted in FIG. 3. The rear segment 41 may be part of the main plate segment 31, and spans an axial length $L_1$ between locations 41a and 41b, as depicted in FIG. 4.

The end segment 42 of the hook 40 extends at an angle from the location 41a of the rear segment 41. In the example shown, the end segment 42 is relatively straight and extends a length $L_2$ that is substantially perpendicular relative to the rear segment 41, although it will be appreciated that the end segment 42 may include a slight concave curvature, or be at an angle different than 90 degrees relative to the rear segment 41.

The front segment 43 of the hook 40 extends from the end segment 42 at an angle, which may be perpendicular to the end segment 42, such that the front segment 43 becomes substantially parallel to the rear segment 41, as shown in FIGS. 3-4. The front segment 43 may span the axial length $L_1$ between locations 43a and 43b, as depicted in FIG. 3.

In this manner, a receiving space 45 is formed between the rear segment 41, the end segment 42 and the front segment 43 of the hook 40. As depicted in FIG. 3, and will be explained in further detail below, the receiving space 45 is dimensioned to receive a portion of the cargo 90, such as a strut 94 of a cart 90 as depicted in FIGS. 1-3.

In one non-limiting example, the length $L_1$ provided by the rear and front segments 41 and 43 may be greater than an axial length 98 of the strut 94 of the cargo 90, and further the length $L_2$ provided by the end segment 42 may be greater than a lateral length 99 of the strut 94 of the cargo 90, as illustrated in FIG. 4. In this manner, the entirety of the strut 94 may be disposed within the boundaries of the receiving space 45 of the hook 40, as shown and explained further below.

Referring to FIG. 4, an exemplary adapter 50 suitable for use with the forward bracket 30 is shown and described. The adapter 50 is coupled to the rear side 32*b* of the forward bracket 30. In this embodiment, two identical adapters 50*a* and 50*b* are spaced-apart along the main longitudinal axis $A_1$ of the rear side 32*b* of the forward bracket 30, as shown in FIG. 4.

In one embodiment, the at least one adapter 50 includes a main body 51 and a first tooth 54*a* that extends downwardly from the body 51, as depicted in FIG. 4. The body 51 defines a front surface 52 that may be flush or nearly flush (e.g., within 0.1 inches) with the front surface 16 of the track 14. The tooth 54*a* is formed with a depth less than a depth of the main body 51. such that the tooth 54*a* defines a void 55*a* between a front surface of the tooth 54*a* and a plane that extends through the front surface 52 of the main body 51. In some embodiments, the void 55*a* is formed with a depth just larger than a thickness of the material that forms the track 14 (and specifically the thickness of the material forming the portion of the track 14 that defines the plurality of apertures 15).

The body 51 of the adapter 50 may further include two or more holes 56, which may be through holes, or in other embodiments may be blind holes that extend into the body from the front surface 52 of the adapter 50. In some embodiments, the holes 56 may be tapped to receive the threads of a correspondingly threaded first fastener that may be used to couple the adapter to the bracket 30. In this example, the bracket 30 may be coupled to each of the adapters 50*a* and 50*b* directly via fasteners 57 that are inserted into secure engagement within the holes 56, as depicted from the front and rear perspective views of FIGS. 3-4.

As best understood with reference to FIGS. 3-4 collectively, the adapters 50 are configured to be received through respective apertures 15 in the track 14. As can be appreciated with reference the figures, the width of the adapters 50 is manufactured to be slightly narrower than the width of the aperture 15 (for embodiments where the apertures 15 are rectangular). The adapters 50 are positioned upon the track 14 such that all of the adapters 50 extend through the respective apertures 15 in the fixed track 14 at the same time, as depicted in FIG. 3. One exemplary coupling of a similar adapter to a track is explained further in U.S. Pat. Pub. 2018/0244186 (hereafter "the '186 published application"), which is hereby incorporated by reference in its entirety.

As will be appreciated, and depicted in the '186 published application, a surface of the tooth 54*a* (and the void 55*a* created by the tooth 54*a*) is positioned to contact the rear surface 17 of the track 14, with a portion of the track 14 disposed within the void 55*a* after the adapters 50 extend through the respective apertures 15. Notably, engagement between the lower edge 19*b* of the aperture 15 and the bottom surface of the body 51 limits the relative downward motion of the adapter 50 with respect to the track 14.

Referring still to FIG. 4, in the exemplary adapters 50 shown herein, in addition to a first tooth 54*a* extending from the lower region of the main body 51, the adapter 50 may further include a second tooth 54*b* extending from the upper region of the main body 51. The second tooth 54*b* may be similar to the first tooth 54*a* in various ways, e.g., the second tooth 54*b* comprises a void 55*b* that may be similar to the void 55*a* explained above with respect to the first tooth 54*a*.

In the embodiment of FIG. 4, the adapter 50 also includes at least one engagement device 59, which is optionally removable or non-removable. In one embodiment, the engagement device 59 is removably positioned within at least one hole 58 in at least one of the first tooth 54*a* and the second tooth 54*b*. The at least one hole 58 may be a blind hole, throughhole, threaded hole, or other variations. In some embodiments, the at least one engagement device 59 is a threaded fastener, a screw, a bolt, a pin (whether a standard or cotter-style pin with a locking device at either end of the pin), and other similar fasteners and engagement devices. As explained further in the '186 published application, the engagement device 59 may comprise a head that extends into the void 55*b*. In this embodiment, the adapter 50 is received within the at least one aperture 15 upon the track 14 such that the lower edge 19*b* of the aperture 15 is received within the first void 55*a*, and the head of the engagement device is configured to interact with the upper edge 19*a* of the aperture 15 so as to substantially prevent the adapter 50 from being translated in a direction along the vertical axis of the aperture 15. Alternatively, the adapter 50 could be oriented such that the engagement device 59 is disposed at the first tooth 54*a* such that the head of the engagement device 59 is configured to interact with the lower edge 19*b* of the aperture 14. Optionally, forward-facing surfaces of the first tooth 54*a* and the second tooth 54*b* may contacts the rear surface 17 of the track 14 when the adapter 50 is received within the at least one aperture 15.

Figure 5:
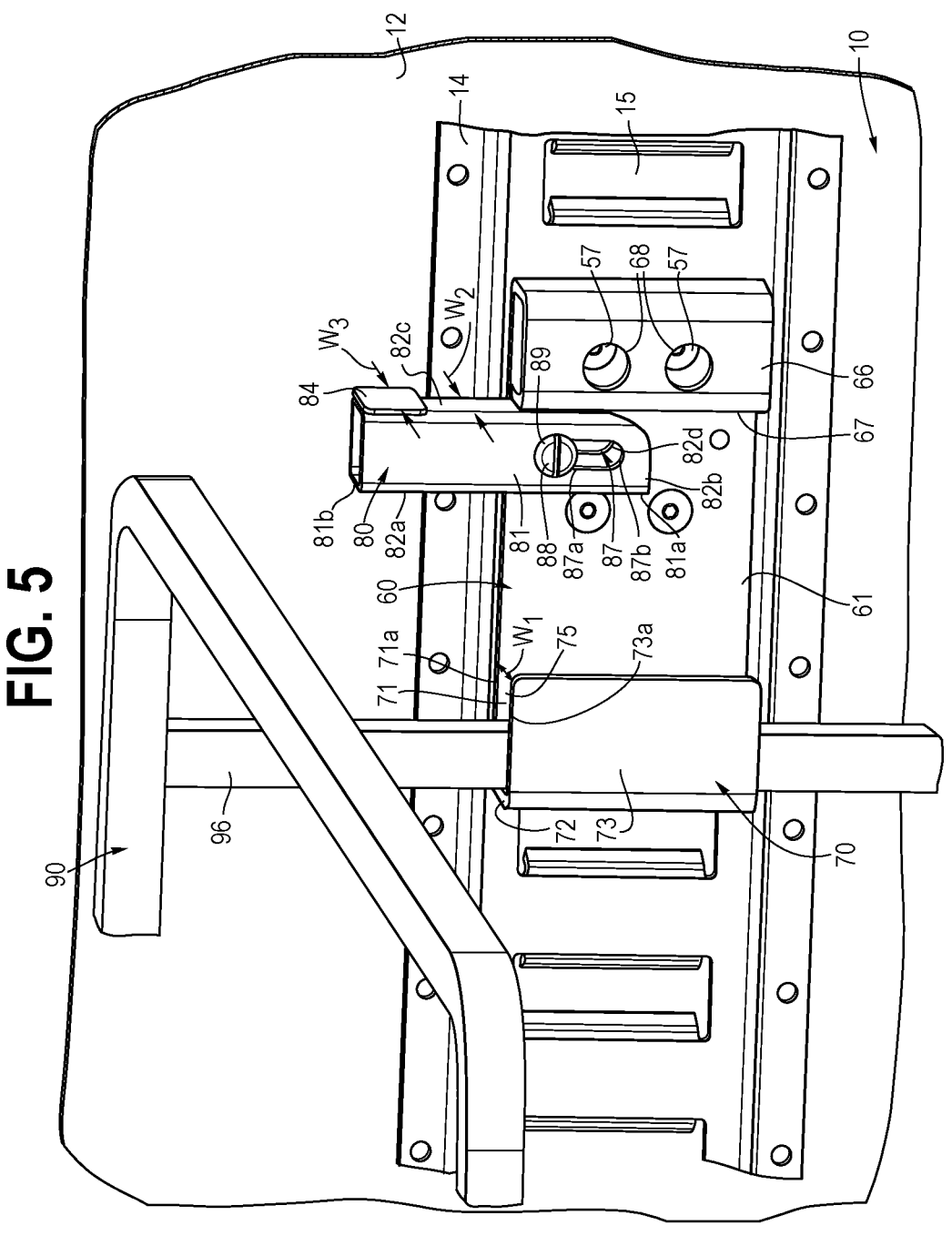
FIG. 5 is a perspective view showing features of a front side of a rearward bracket of the system of FIGS. 1-2, the rearward bracket having a locking member, wherein the rearward bracket is coupled to a track in the cargo compartment and the locking member is in an open state.
Figure 6:
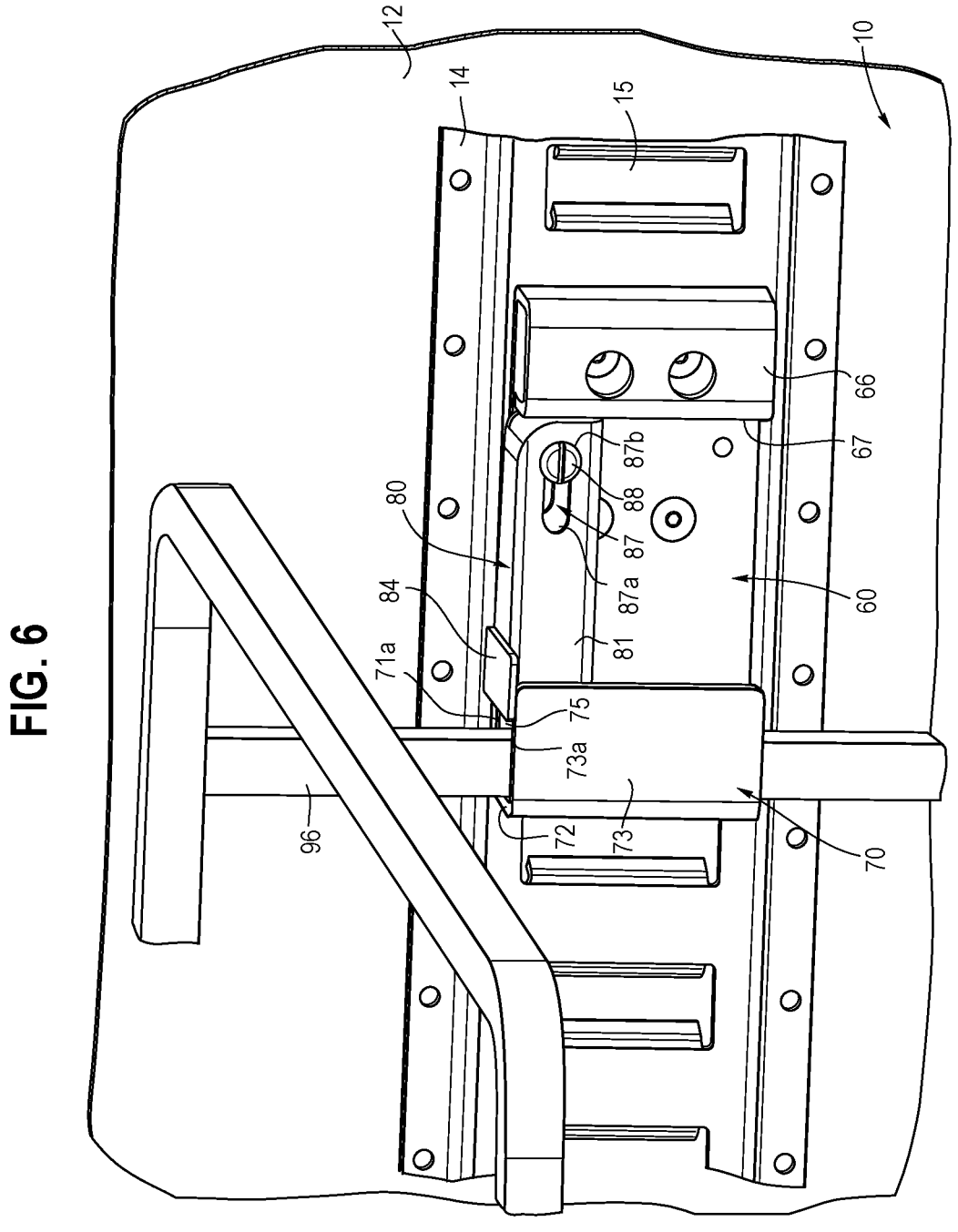
FIG. 6 is a perspective view showing the rearward bracket of FIG. 5 in a closed state.
Figure 7:
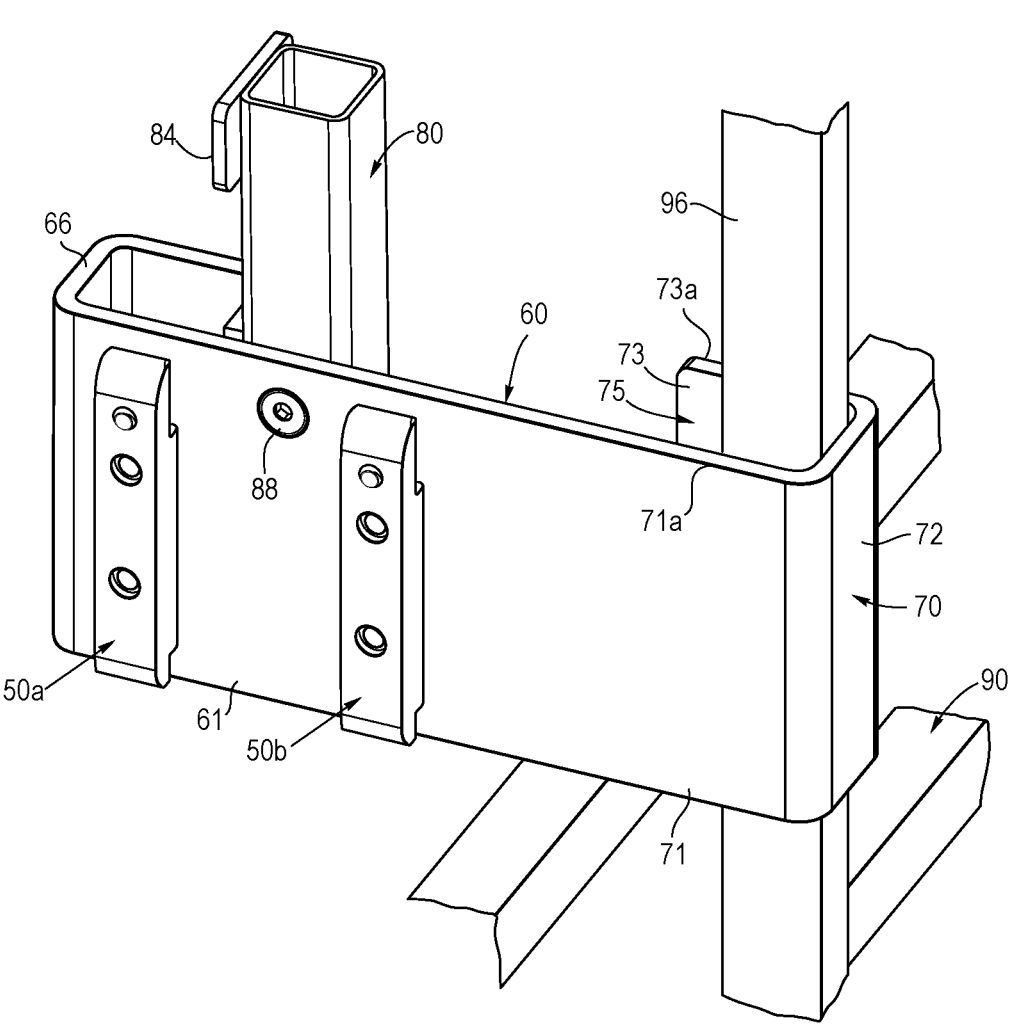
FIG. 7 is a perspective view showing features of a rear side of the rearward bracket of FIGS. 5-6, with the locking member in an open state (where the track in the cargo compartment is omitted for illustrative purposes).

Referring to FIGS. 5-7, further features of one embodiment of the rearward bracket 60 are shown and described. In this embodiment, the rearward bracket 60 may be similar to the forward bracket 30 as explained in detail above, although certain distinctions of the rearward bracket 60 will be illustrated further.

The rearward bracket 60 may comprise a main plate segment 61 and a hook 70, which correspond to the main plate segment 31 and the hook 40 of the forward bracket 30, respectively. Moreover, the rearward bracket 60 may comprise one or more adapters 50, such as adapters 50*a* and 50*b* as seen in FIG. 7, which may correspond to the adapters 50*a* and 50*b* described in detail above with respect to the forward bracket 30, and thus for brevity are not discussed further with reference to FIGS. 5-7.

The rearward bracket 60 additionally comprises a locking member 80, which has an open state as shown in FIG. 5 and FIG. 7, and a closed state as shown in FIG. 6, to facilitate securement of a portion of the cargo 90 (such as a vertical rearward strut 96 of a cart 90) within a receiving space 75 of the hook 70. In the example shown, the locking member 80 rotates in a counterclockwise direction between the open state and the closed state, although it will be appreciated that other axial or rotational movements may be used to transition the locking member 80 between open and closed states.

As shown in FIG. 5, the locking member 80 comprises a main body 81 that extends along a primary axis between a first end 81*a* and a second end 81*b*. In this example, the main body 81 comprises a hollow square cross-section, although it will be appreciated that other shapes besides a square cross-section may be used, and various portions of the main body may be solid.

The locking member 80 comprises four main sides 82a-82d, as depicted in FIG. 5. The first and third sides 82a and 82c are opposing one another, and comprise a width $W_2$, as shown in FIG. 5. The width $W_2$ may be slightly smaller than a width $W_1$ of the receiving space 75 of the hook 75, where the width $W_1$ extends between the rear and front segments 71 and 73 of the hook 70 as depicted in FIG. 5 (in some embodiments, the width $W_1$ may approximate the length $L_2$ of the end segment 72 of the hook, as the length $L_2$ was explained in FIG. 4). In this manner, the width $W_2$ of the locking member 80 will be allowed to pass into a portion of the greater width $W_1$ of the receiving space 75 of the hook 70.

A stop member 84 may be disposed on the third side 82c near the second end 81b of the locking member 80 to limit movement of the locking member 80 in the closed state. The stop member 84 comprises at least one dimension that extends laterally beyond the periphery of the third side 82c. For example, the stop member 84 may comprise a continuous plate-like member having a width $W_3$ that is greater than the width $W_2$ of the third side 82c of the locking member 80, as depicted in FIG. 5. In this manner, the greater width $W_3$ of the stop member 84 will catch upon the upper surfaces 71a and/or 73a of the hook 70 in the closed state, as depicted in FIG. 6. It will be appreciated that, in lieu of one continuous plate-like member as the stop member 84, multiple plate-like members may be used. Alternatively, beads or welds may extend laterally outward from the second side 82b and/or the fourth side 82d at locations near where they meet up with the third side 82c, and further near the second end 81b of the locking member 80, such that the beads or welds catch upon the upper surfaces 71a and/or 73a of the hook 70 in the closed state of FIG. 6.

Referring still to FIGS. 5-6, in this embodiment, the locking member 80 comprises a slot 87 extending along a portion of the length between the first and second ends 81a and 81b, and through the second side 82d and the fourth side 82d. A pivot pin 88 extends laterally through the slot 87 between the second side 82b and the fourth side 82d, as depicted in FIGS. 5-6. One end of the pivot pin 88 may be secured to the main plate segment 61 of the rearward bracket 60 as depicted in FIG. 7, e.g., by screwing, welding or other means. An opposing end of the pivot pin 88 may comprise an enlarged head 89, which sits beyond the second side 82b of the locking member 80 as depicted in FIGS. 6-7, thereby capturing the locking member 80 between the enlarged head 89 and the main plate segment 61, while allowing for selective axial and rotational movement of the locking member 80 relative to the pivot pin 88.

In one embodiment, a blocking bar 66 may be positioned on the main plate segment 61 rearward of the locking member 80 to limit rotational movement of the locking member 80 in a clockwise direction, for example, when the locking member 80 abuts a forward-facing surface 67 of the blocking bar 66, as depicted in FIG. 5. While the blocking bar 66 is depicted as having a square cross-section in this embodiment, it alternatively may comprise a flat plate, or one or more beads or welds, which extend inward from the main plate segment 61 and also serve to block clockwise rotation of the locking member 80. In the example of a square cross-sectional blocking bar 66, one or more openings 68 may be provided to gain access to the fasteners 57 described above that secure the adapters 50 to the main plate segment 61.

An exemplary method of using the system 20 of FIGS. 1-7 to secure one or more pieces of cargo 90 within the cargo compartment 10 will be explained further. In a first step, a forward bracket 30 and a rearward bracket 60 may be coupled to the track 14 at spaced-apart axial locations. Specifically, the adapters 50 of the forward bracket 30 and the rearward bracket 60 engage openings 15 in the track 14, as explained in detail above, thereby securely coupling each of the forward bracket 30 and the rearward bracket 60 along the track 14 at a predetermined distance (which may correspond roughly to securement locations of the cargo, as shown and explained).

In another step, a piece of cargo 90, such as the first cart 90a, is maneuvered in the cargo compartment (optionally via movement with wheels 91, and with or without items already stored on a surface 92) until an outer region 93 of the cargo 90 approaches the sidewall 12 of the cargo compartment 12. In a next step, the first cart 90a then may be pushed adjacent to or abutting the sidewall 12 of the cargo compartment, such that a forward strut 94 of the first cart 90a may be disposed slightly rearward of the hook 40 of the forward bracket 30, and a rearward strut 96 of the first cart 90a may be disposed slightly rearward of the hook 70 of the rearward bracket 60. Then, the first cart 90a is pushed forward (while remaining close to or abutting the sidewall 12) such that the forward strut 94 enters into the receiving space 45 of the hook 40 of the forward bracket 30, and simultaneously the rearward strut 96 enters into the receiving space 75 of the hook 70 of the rearward bracket 60, as depicted in FIGS. 1-2.

In a next step, the locking member 80 of the rearward bracket 60 is then rotated from the open state of FIG. 5 to the closed state of FIG. 6. To accomplish this, the locking member 80 may first be moved axially upward by moving the slot 87 relative to the pivot pin 88, such that the pivot pin 88 moves away from a first end 87a of the slot and becomes closer to an opposing second end 87b of the slot 87, after upward movement of the locking member 80. Then, the locking member 80 is rotated counterclockwise until the stop member 84 catches upon the upper surfaces 71a and/or 73a of the hook 70, as shown in the closed state of FIG. 6 and explained in detail above. At this time, all sides of the rearward strut 96 of the first cart 90a are effectively captured within the receiving space 75 of the hook 70.

In this state of FIGS. 1-2 and FIG. 6, the first cart 90a is securely engaged against the sidewall 12 of the cargo compartment 10, and is prevented from both forward and lateral movement by the forward bracket 30, and further prevented from forward, rearward and lateral movement by the rearward bracket 60. It will be appreciated that subsequent pieces of cargo, such as the second cart 90b, then may be loaded using the same steps outlined above with other forward and rearward brackets 30 and 60.

Advantageously, the system 20 avoids the need to use cargo securement straps to secure cargo. In the example where the cargo 18 comprises a plurality of carts, a significant number of straps would be required to adequately restrain the carts individually, and the straps would take a relatively long time to install (and subsequently roll up to a storage state), as compared to the forward and rearward brackets 30 and 60 of the present embodiments. Moreover, the system 20 avoids the need for wide beams that extend between opposing sidewalls 12 of the cargo compartment 10 to restrain the cargo.

As yet another advantage, the forward and rearward brackets 30 and 60 may be compatible with most existing cargo compartments having a pre-existing track 14, particularly an "A" or "E" track. In this manner, an existing cargo compartment can be retrofitted with variable securement locations for an array of cargo using the forward and rearward brackets 30 and 60.

Figure 8:
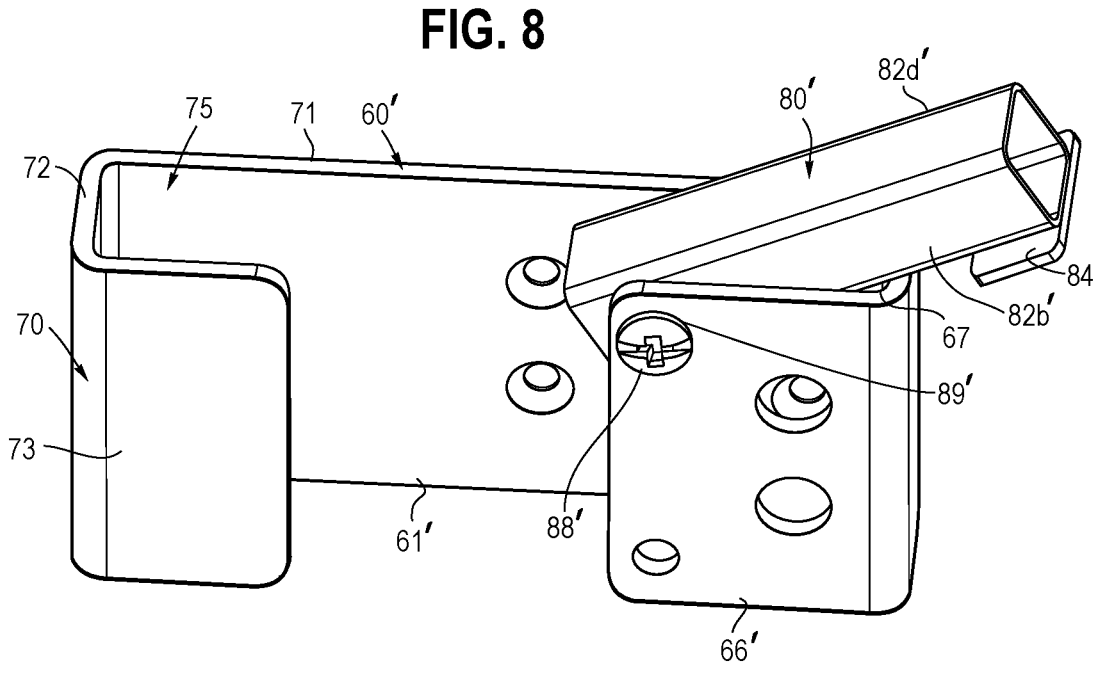
FIG. 8 is a perspective view showing features of a front side of an alternative bracket having a locking member, wherein the locking member is in an open state.
Figure 9:
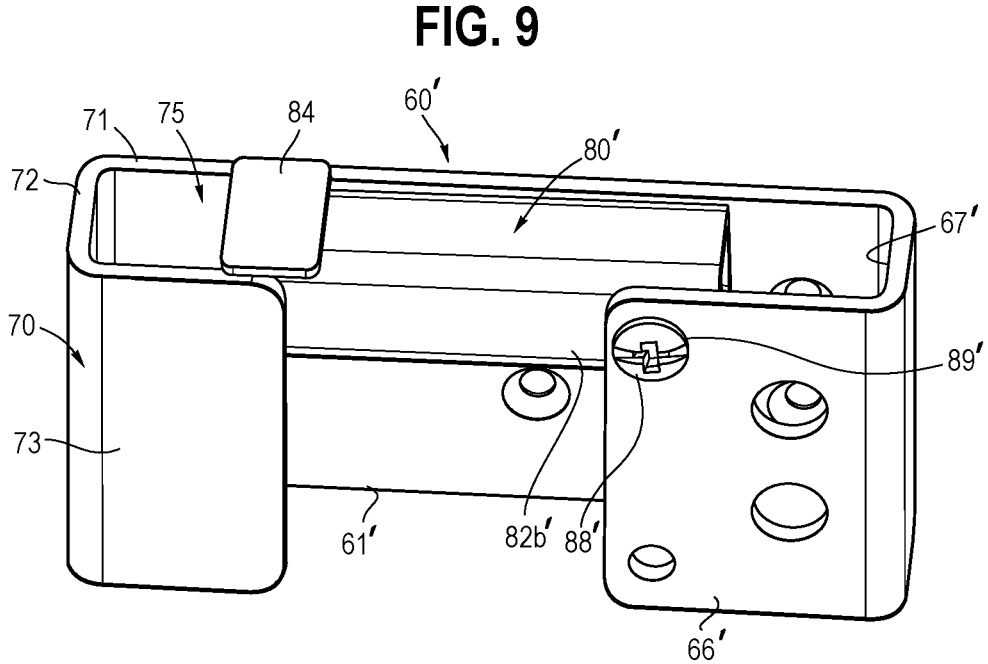
FIG. 9 is a perspective view showing the locking member of FIG. 8 in a closed state.

Referring to FIGS. 8-9, an alternative rearward bracket 60' is shown and described. The rearward bracket 60' is similar to the rearward bracket 60 of FIGS. 5-7, with minor differences noted herein. In particular, in FIGS. 8-9, the elongated slot 87 of FIGS. 5-7 has been omitted and therefore the locking member 80' does not slide axially relative to the pivot pin 88'. Rather, the locking member 80' may comprise small circular openings (not shown) in the second side 82b' and the fourth side 82d', through which a main shaft of the pivot pin 88' extends, whereby the tolerance is relatively small such that the locking member 80' can only rotate relative to the pivot pin 88'. Like the embodiment of FIGS. 5-6, in the embodiment of FIGS. 8-9 the second end of the pivot pin 88' may comprise an enlarged head 89', which sits beyond the second side 82b' of the locking member 80' as depicted in FIGS. 8-9, thereby capturing the locking member 80' between the enlarged head 89' and the main plate segment 61', while allowing for selective rotational movement of the locking member 80' relative to the pivot pin 88'.

Additionally, in the example of FIGS. 8-9, an alternative blocking bar 66' may be similar to blocking bar 66 described above, but may have an aperture that receives the main shaft of the pivot pin 88', such that the enlarged head 89' of the pivot pin 88' extends beyond an inward face of the blocking bar 66', as shown in FIGS. 8-9. Further, the blocking bar 66' may omit a square cross-section, and instead be open at its forward-facing side, thereby facilitating rotation of the locking member 80' in the counterclockwise direction. Notably, the locking member 80' is presented from extensive clockwise rotation by a surface 67 of the blocking bar 66', as depicted in the state of FIG. 8.

In further alternative embodiments, it will be appreciated that the hooks 40 and 70 may be located at the rearward regions of the forward and rearward brackets 30 and 60, respectively, and the locking member 80 may be disposed near the forward region of the rearward bracket 60, such that the design of the system is performed in a mirror-image manner, where the cargo 90 would then be loaded into engagement with the forward and rearward brackets 30 and 60 in a forward to rearward direction (the opposite of the direction explained in the non-limiting example above).

Moreover, it will be appreciated that while the "rearward bracket" of the system has been described as the bracket having the locking member 80, it will be appreciated that in alternative embodiments, the bracket having the locking member 80 may be positioned forward of another bracket having only a hook (without a locking member).

Still further, it will be appreciated that only one bracket may be used in the system 20. For example, only one bracket 60 or 60' may be provided, and by itself could limit forward, rearward and lateral movement of the cargo 90, e.g., when a strut 94 or 96 is secured in the receiving space 75 of the hook 70 and held in place by the locking members 80 or 80'. In other words, it may be preferable to have a system with two spaced-apart brackets 30 and 60 (where one has a locking member 80 and the other does not), but a system with only one bracket having a locking member is within the scope of the present embodiments.

Figure 10:
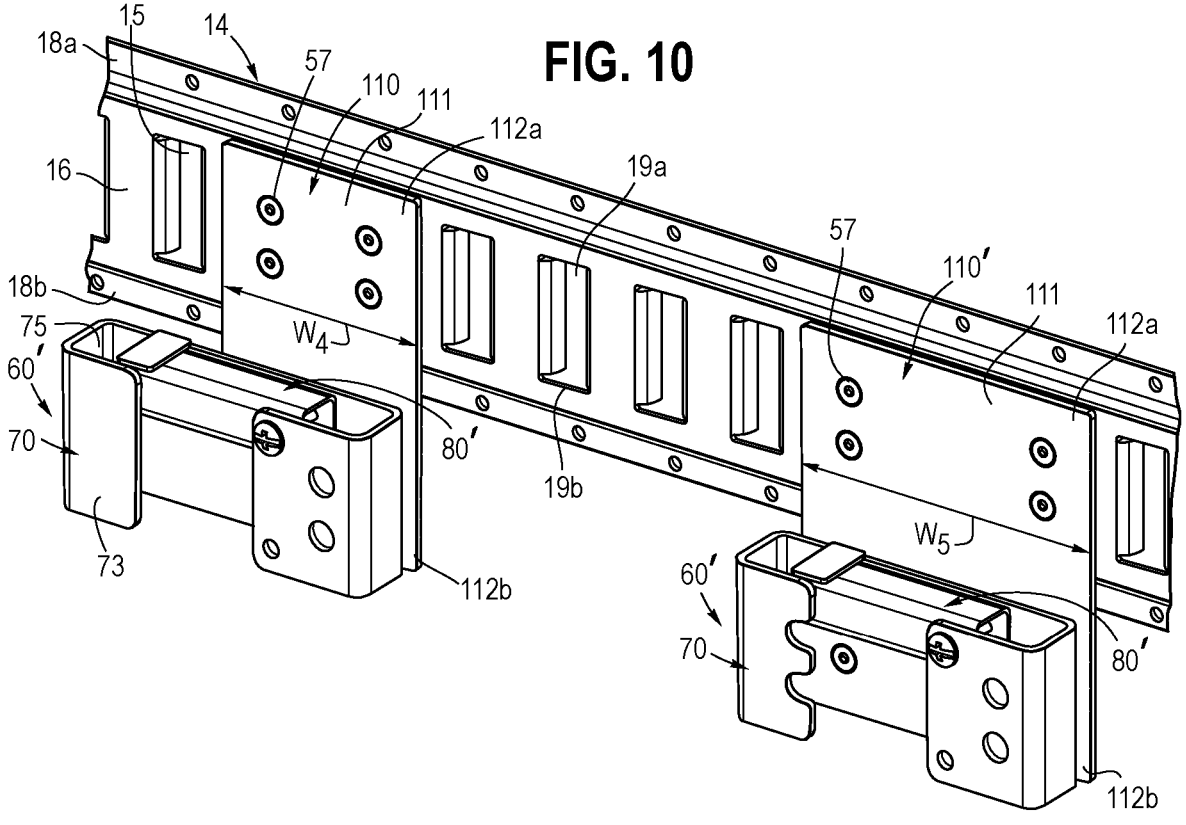
FIG. 10 is a perspective view of an alternative embodiment comprising an extension plate coupled to at least one forward or rearward bracket.

Referring now to FIG. 10, an alternative embodiment is shown that depicts the rearward bracket 60' and the locking member 80' described above, while coupling an extension plate 110 or 110' to the rearward bracket 60'. It should be noted that, while the extension plate 110 or 110' will be described for the sake of brevity and case of reference as being coupled to the rearward bracket 60', it will be appreciated that the extension plate 110 or 110' could be coupled to the rearward bracket 60 described earlier, and also may be coupled to the forward bracket 30, too. In short, it will be understood that the advantages for which the extension plate 110 or 110' provide for offsetting the rearward bracket 60' may equally apply to usage with the other brackets described herein.

In FIG. 10, the extension plate 110 or 110' may be used to provide a vertical offset of the rearward bracket 60' relative to the track 14, particularly in situations where the cargo 90 has horizontal struts or shelves 95 (as shown in FIGS. 1-2) that extend axially between forward and rearward struts 94 and 96, and which are vertically aligned with the track 14. In such situations, in the absence of having an extension plate 110 or 110', the hook 70 of the bracket 60' may vertically align with a horizontal strut 95, as opposed to the vertical struts 94 or 96. Problematically, in such situations, the horizontal strut 95 cannot enter into the receiving space 75 due to being blocked by the front segment 73 of the bracket 60'. However, the provision of an extension plate 110 or 110' provides a height differential sufficient to vertically offset the horizontal strut 95 from the hook 70, thereby ensuring that the hook 70 is aligned with a vertical strut 94 or 96 to allows its entry into the receiving space 75.

As shown in FIG. 10, the extension plate 110 comprises a main body 111, which in this example may comprise a generally rectangular shape, having a width $w_4$, and a height extending between an upper region 112a and a lower region 112b. As depicted in FIG. 10, the rearward bracket 60' is coupled to the main body 111 at a location closer to the lower region 112b, e.g., by soldering, welding, mechanical couplings, or other techniques. The fasteners 57, which couple the bracket 60' to the adapters 50a and 50b, are disposed through the upper region 112a of the main body 111 of the extension plate 110. The adapters 50a and 50b are coupled to the track 14 in the same manner described above, with the upper region 112a of the extension plate 110 vertically overlapping with the track 14, but with the lower region 112b of the extension plate 110 suspending the bracket 60' at a vertical height lower than the track 14.

Referring still to FIG. 10, the width $w_4$ of the extension plate 110 is narrower than a width $w_5$ of the alternative extension plate 110'. The extension plate 110 is designed to accommodate axially spaced-apart fasteners 57 that secure adapters 50a and 50b to adjacent apertures 15 in the track 14, while the wider extension plate 110' is designed to accommodate axially spaced-apart fasteners 57 that secure adapters 50a and 50b in non-adjacent apertures 15 in the track 14, i.e., with at least one open aperture 15 between the location aligned with the fasteners 57. However, the extension plates 110 and 110' otherwise function in a similar manner and achieve the same advantages.

Figure 11:
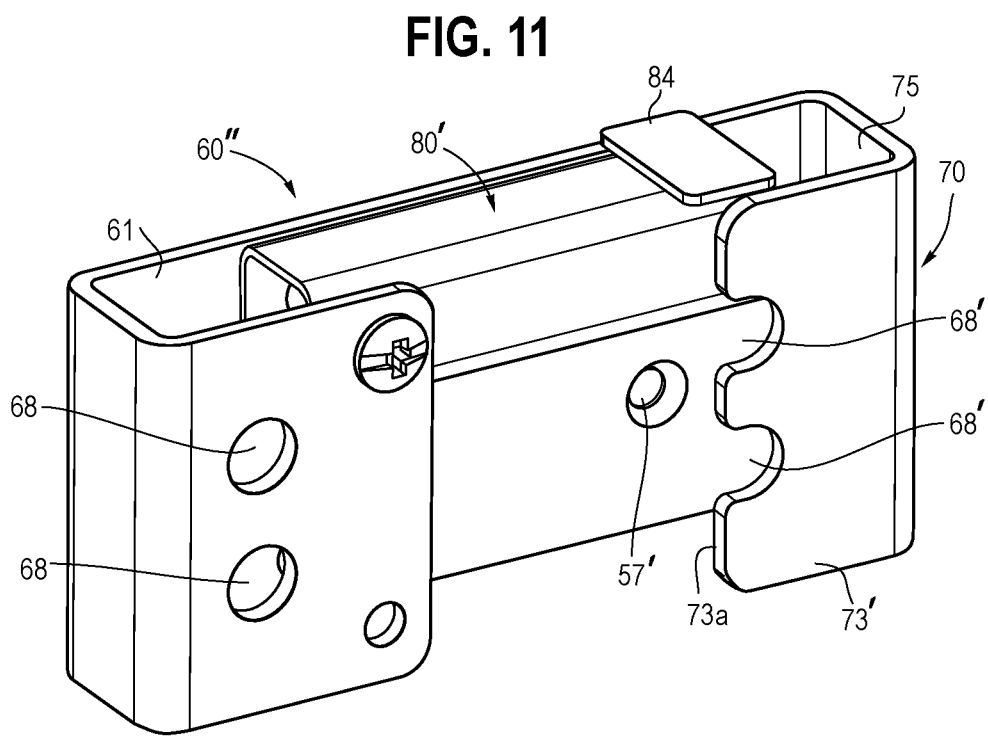
FIG. 11 is a perspective view of a further alternative embodiment comprising openings in a portion of a bracket to facilitate access to fasteners.

Referring now to FIG. 11, an alternative rearward bracket 60" is shown, which is similar to the alternative rearward bracket 60' described above (yet shown in a reverse manner with the hook 70 on the right of the page in FIG. 11, as opposed to on the left in FIGS. 8-9). The rearward bracket 60" may comprise one or more openings 68, similar to those described above in FIG. 5, in order to gain access to the fasteners 57 that secure the adapters 50 to the main plate segment 61.

Additionally, in the example of FIG. 11, at least one partial cutout 68' is provided in an alternative front segment 73' of the hook 70. In FIG. 11, two cutouts 68' are provided, where one is above the other, and each cutout 68' is formed into a side end 73a of the front segment 73', at a location such that the cutouts 68' align with apertures 57' in the main plate segment 61 through which the fasteners 57 are disposed.

In the example of FIG. 11, the cutouts 68' comprise generally semi-circular shapes, which may be used when approximately one half of an aperture 57' would overlap with the front segment 73' (had the cutouts 68' not been provided). In this manner, user access is provided to the entirety of the fasteners 57. As will be apparent, such partial cutouts 68' may be employed in the forward brackets 30, and the other rearward bracket 60, described above.

Figure 12:
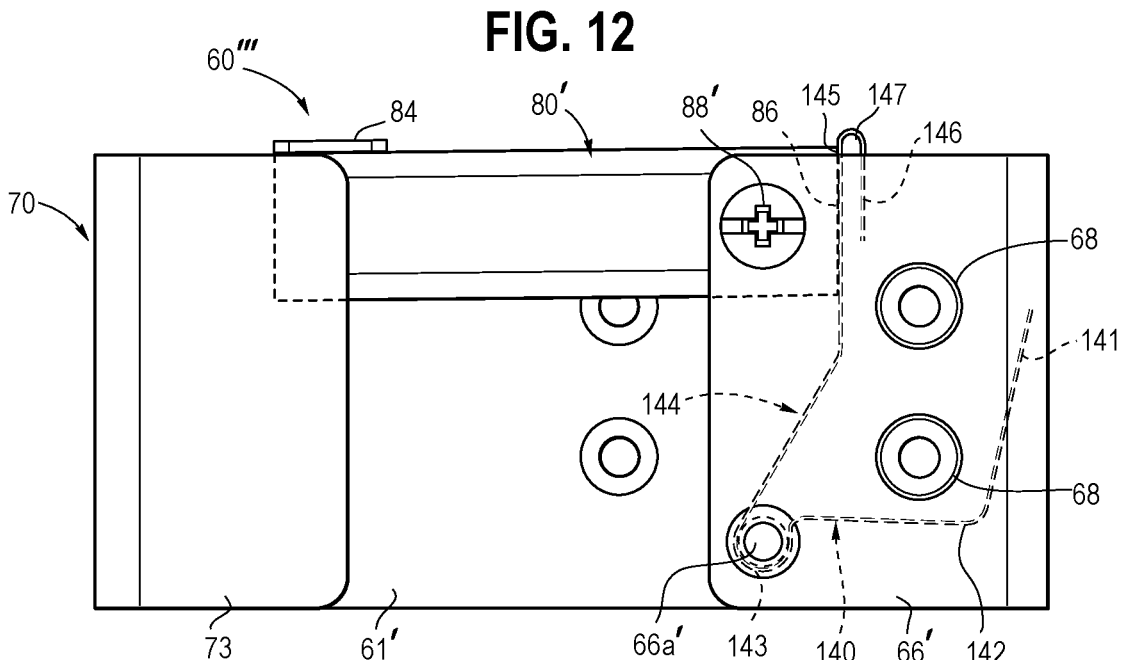
FIG. 12 is a perspective view of yet a further alternative embodiment, in which a spring is included to bias the locking member to a closed state.

Referring now to FIG. 12, in a further alternative embodiment, a rearward bracket 60''' comprises at least one spring 140 that is operatively coupled to the locking member 80' to bias the locking member 80' to a closed state. In this example, the spring 140 comprises a torsion spring having a selected geometry (explained below); however, it will be appreciated that other springs, such as compression springs, coil springs, torsion springs with alternative geometries, or non-spring compression members (such as solid compressible materials, such as foam and the like) may be used in lieu of the spring 140 to provide the biasing actions described.

As shown in FIG. 12, the spring 140 may comprise a first end 141 that extends to a second end 146. In one embodiment, the first end 141 of the spring 140 may be positioned adjacent to an outer end of the blocking bar 66' described above. The first end 141 then extends along an extension region 142 to a pivot region 143, where the spring 140 is disposed around a pivot point 66a' of the blocking bar 66'. The pivot point 66a' may comprise a pin or other element to which the pivot region 143 of the spring 140 is secured. The spring 140 then extends along an extension region 144 towards an end region 86 of the locking member 80'. In one embodiment, as depicted in FIG. 12, a segment 145 of the spring 140 may be coupled to the end region 86 of the locking member 80', in a manner that abuts or urges the locking member 80' towards the closed state shown in FIG. 12. In this embodiment, the spring 140 then extends from the segment 145 to the second end 146, with a bend 147 positioned in-between segment 145 and the second end 146.

During use, the spring 140 presses upon the end region 86 of the locking member 80', in a manner that biases the locking member 80' towards the closed state shown in FIG. 12. In order to transition the locking member 80' to the open state, a user can apply an upward force to the stop member 84 (or upward and axially to the right), which will pivot the locking member 80' around pivot pin 88' and overcome the force provided by the spring 140. Once the user force is released, the spring 140 will bias the locking member 80' to the closed state again.

Advantageously, in the embodiment of FIG. 12, cargo 90 may be safely restrained by ensuring that the locking member 80' remains closed by the biasing action of the spring 140, particularly during transport, when bumps in the road or other forces may act upon the locking member 80'. In alternative embodiments, the weight of the locking member 80' itself may be increased to facilitate its bias towards the closed state, with or without a spring.

While various embodiments of the invention have been described, the invention is not to be restricted except in light of the attached claims and their equivalents. Moreover, the advantages described herein are not the only advantages of the invention and it is not necessarily expected that every embodiment of the invention will achieve all of the advantages described.

We claim:

1. A system for restraining cargo in a cargo compartment, the system comprising:
   a bracket having a main plate segment, the main plate segment having a front side and a rear side and a first opening that extends through the main plate segment;
   a first adapter positioned on the rear side, wherein the first adapter is configured to be releasably secured to a first aperture in a logistics track within the cargo compartment; wherein the first adapter comprises a second opening; wherein a first fastener is positioned in the first opening and in the second opening to removably couple the first adapter to the main plate segment; wherein the first adapter comprises a third opening; and wherein a second fastener is removably coupled in the third opening and interacts with an edge of the first aperture to retain the first adapter in the first aperture;
   a hook disposed along a portion of the bracket, the hook comprising a rear segment, an end segment and a front segment,
   wherein a receiving space is formed between the rear segment, the end segment and the front segment,
   wherein a portion of cargo is dimensioned to be placed within a portion of the receiving space; and
   a locking member having an open state and a closed state, wherein the portion of cargo is capable of being inserted into the receiving space when the locking member is in the open state, and wherein the portion of cargo is restrained from forward, rearward and lateral movement in the cargo compartment when the locking member is in the closed state.

2. The system of claim 1 further comprising: a fourth opening extending through the main plate segment; and a second adapter positioned on the rear side, wherein the second adapter is configured to be releasably secured to a second aperture in the logistics track within the cargo compartment; wherein the second adapter comprises a fifth opening; wherein a third fastener is positioned in the fourth opening and in the fifth opening to removably couple the second adapter to the main plate segment; wherein the second adapter comprises a sixth opening; and wherein a fourth fastener is removably coupled in the sixth opening and interacts with an edge of the second aperture to retain the second adapter in the second aperture.

3. The system of claim 1, wherein the locking member comprises a main body having a width that is less than a width of the receiving space so that a portion of the locking member extends into the receiving space in the closed state.

4. The system of claim 3, wherein the locking member further comprises a stop member connected to the locking member, the stop member having a width greater than the width of the receiving space, such that stop member limits movement of the locking member into the receiving space in the closed state.

5. The system of claim 4, wherein the stop member is dimensioned to catch upon at least one of an upper surface of the rear segment of the hook member or an upper surface of the front segment of the hook member in the closed state.

6. The system of claim 4, wherein the stop member comprises a plate-like member having a width that extends laterally beyond a periphery of the main body of the locking member.

7. The system of claim 1, wherein the locking member comprises a main body that is rotatable relative to the hook, wherein the locking member rotates into engagement with a portion of the hook in the closed state.

8. The system of claim 7, wherein the locking member is both axially moveable and rotatable relative to the main plate segment.

9. The system of claim 1, further comprising at least one spring that is operatively coupled to the locking member to bias the locking member to the closed state.

10. The system of claim 1, further comprising an extension plate coupled to the bracket, wherein the extension plate provides a vertical offset of a portion of the bracket relative to the location that the adapter is secured in the cargo compartment.

11. A system for restraining cargo in a cargo compartment, the system comprising:

first and second brackets, each of the first and second brackets having a main plate segment including a front side and a rear side;

at least one adapter coupled to the first bracket and configured to be releasably secured to a first location within the cargo compartment;

at least one adapter coupled to the second bracket and configured to be releasably secured to a second location within the cargo compartment, wherein the first and second locations are spaced-apart from one another;

a first hook having a first receiving space disposed along a portion of the first bracket;

a second hook having a second receiving space disposed along a portion of the second bracket, wherein a first portion of cargo is dimensioned to be placed within the first receiving space of the first hook of the first bracket, and a second portion of cargo is dimensioned to be placed within the second receiving space of the second hook of the second bracket; and the second bracket comprising a locking member having an open state and a closed state, wherein the first bracket is free of any locking member.

12. The system of claim 11, wherein the second portion of cargo is capable of being inserted into the second receiving space when the locking member is in the open state, and wherein the second portion of cargo is restrained from forward, rearward and lateral movement in the cargo compartment when the locking member is in the closed state.

13. The system of claim 12, wherein during use, the first bracket is coupled to a track within the cargo compartment at a predetermined location forward relative to where the second bracket is coupled to the track within the cargo compartment.

14. The system of claim 12, wherein the locking member comprises a main body having a width that is less than a width of the second receiving space so that a portion of the locking member extends into the second receiving space in the closed state.

15. The system of claim 14, wherein the locking member further comprises a stop member connected to the locking member, the stop member having a width greater than the width of the second receiving space, such that stop member limits movement of the locking member into the second receiving space in the closed state.

16. The system of claim 15, wherein the stop member is dimensioned to catch upon an upper surface of the second hook member in the closed state.

17. The system of claim 12, wherein the locking member comprises a main body that is rotatable relative to the second hook, wherein the locking member rotates into engagement with a portion of the second hook in the closed state.

18. A bracket for restraining cargo in a cargo compartment by releasably securing to one or more apertures of a logistics track, the bracket comprising:

a main plate segment having a front side and a rear side;

a first adapter positioned on the rear side, wherein the first adapter is configured to be releasably secured to a first aperture in the logistics track;

a hook disposed along a portion of the bracket, the hook comprising a rear segment, an end segment and a front segment, wherein a receiving space is formed between the rear segment, the end segment and the front segment, and a locking member having an open state and a closed state, the locking member comprises a main body having a width that is less than a width of the receiving space so that a portion of the locking member extends into the receiving space in the closed state, wherein the locking member further comprises a stop member connected to the locking member, the stop member having a width greater than the width of the receiving space, such that stop member limits movement of the locking member into the receiving space in the closed state.

19. The bracket of claim 18, wherein the stop member is dimensioned to catch upon at least one of an upper surface of the rear segment of the hook member or an upper surface of the front segment of the hook member in the closed state.

20. The system of claim 19, wherein the stop member comprises a plate-like member having a width that extends laterally beyond a periphery of the main body of the locking member.

\* \* \* \* \*